United States Patent
Tamaura

(10) Patent No.: US 11,387,773 B2
(45) Date of Patent: Jul. 12, 2022

(54) HELIOSTAT APPARATUS

(71) Applicant: Tressbio Laboratory Co., Ltd., Tokyo (JP)

(72) Inventor: Yutaka Tamaura, Ota-ku (JP)

(73) Assignee: TRESSBIO LABORATORY CO., LTD., Tokyo (JP)

(*) Notice: Subject to any disclaimer, the term of this patent is extended or adjusted under 35 U.S.C. 154(b) by 0 days.

(21) Appl. No.: 17/059,670

(22) PCT Filed: Mar. 20, 2019

(86) PCT No.: PCT/JP2019/011676
§ 371 (c)(1),
(2) Date: Nov. 30, 2020

(87) PCT Pub. No.: WO2019/230150
PCT Pub. Date: Dec. 5, 2019

(65) Prior Publication Data
US 2021/0226577 A1    Jul. 22, 2021

(30) Foreign Application Priority Data

May 31, 2018  (JP) .............................. JP2018-104946

(51) Int. Cl.
*H02S 20/32* (2014.01)
(52) U.S. Cl.
CPC .................. *H02S 20/32* (2014.12)
(58) Field of Classification Search
CPC .......... H02S 20/32; H02S 20/10; H02S 20/30; Y02E 10/50
See application file for complete search history.

(56) References Cited

U.S. PATENT DOCUMENTS 5,317,145 A    5/1994 Corio
2010/0102201 A1    4/2010 Sherman
(Continued)

FOREIGN PATENT DOCUMENTS

JP    2001-217447 A    8/2001
JP    2010-258369 A    11/2010
(Continued)

OTHER PUBLICATIONS

WO 2014071683 A1, Machine Translation, pp. 1-6, (Year: 2014).*
(Continued)

*Primary Examiner* — Devina Pillay
(74) *Attorney, Agent, or Firm* — Oliff PLC

(57) ABSTRACT

A heliostat apparatus including: a frame supporting a solar battery panel; a north-south rotation mechanism having an elevation angle rotation axis for rotating the frame in a north-south direction; an east-west rotation mechanism having an azimuth angle rotation axis for rotating the frame in an east-west direction; and a support, where an angle in the north-south direction of a panel surface of the solar battery panel is adjusted by the north-south rotation mechanism; an angle in the east-west direction of the panel surface is adjusted by the east-west rotation mechanism; the elevation angle rotation axis and the azimuth angle rotation axis are in a skew positional relationship; and the frame is held by a truss structure of each of the north-south rotation mechanism and the east-west rotation mechanism. A type of heliostat apparatus that follows the movement of the sun and can hold a solar battery panel stably.

8 Claims, 8 Drawing Sheets

(56) References Cited

U.S. PATENT DOCUMENTS

| | | | |
|---|---|---|---|
| 2011/0114080 A1* | 5/2011 | Childers | ................ F24S 30/48 |
| | | | 126/601 |
| 2012/0048340 A1 | 3/2012 | Qadir | |
| 2012/0123720 A1* | 5/2012 | Fukuba | .................. F24S 40/90 |
| | | | 702/94 |
| 2016/0153681 A1 | 6/2016 | Plourde et al. | |
| 2016/0301357 A1* | 10/2016 | Chen | ..................... G01S 3/7861 |
| 2019/0165721 A1 | 5/2019 | Tamaura | |

FOREIGN PATENT DOCUMENTS

| | | | | |
|---|---|---|---|---|
| JP | 2017-227408 A | 12/2017 | | |
| WO | 2008/092195 A1 | 8/2008 | | |
| WO | WO-2014071683 A1 * | 5/2014 | ............ | H02S 20/32 |
| WO | 2016/089875 A1 | 6/2016 | | |

OTHER PUBLICATIONS

Dec. 1, 2020 International Preliminary Report on Patentability issued in International Patent Application No. PCT/JP2019/011676.

Apr. 16, 2019 International Search Report issued in International Patent Application No. PCT/JP2019/011676.

Apr. 9, 2019 Office Action issued in Japanese Patent Application No. 2018-104946.

Feb. 3, 2022 Extended European Search Report issued in European Patent Application No. 19812089.1.

* cited by examiner

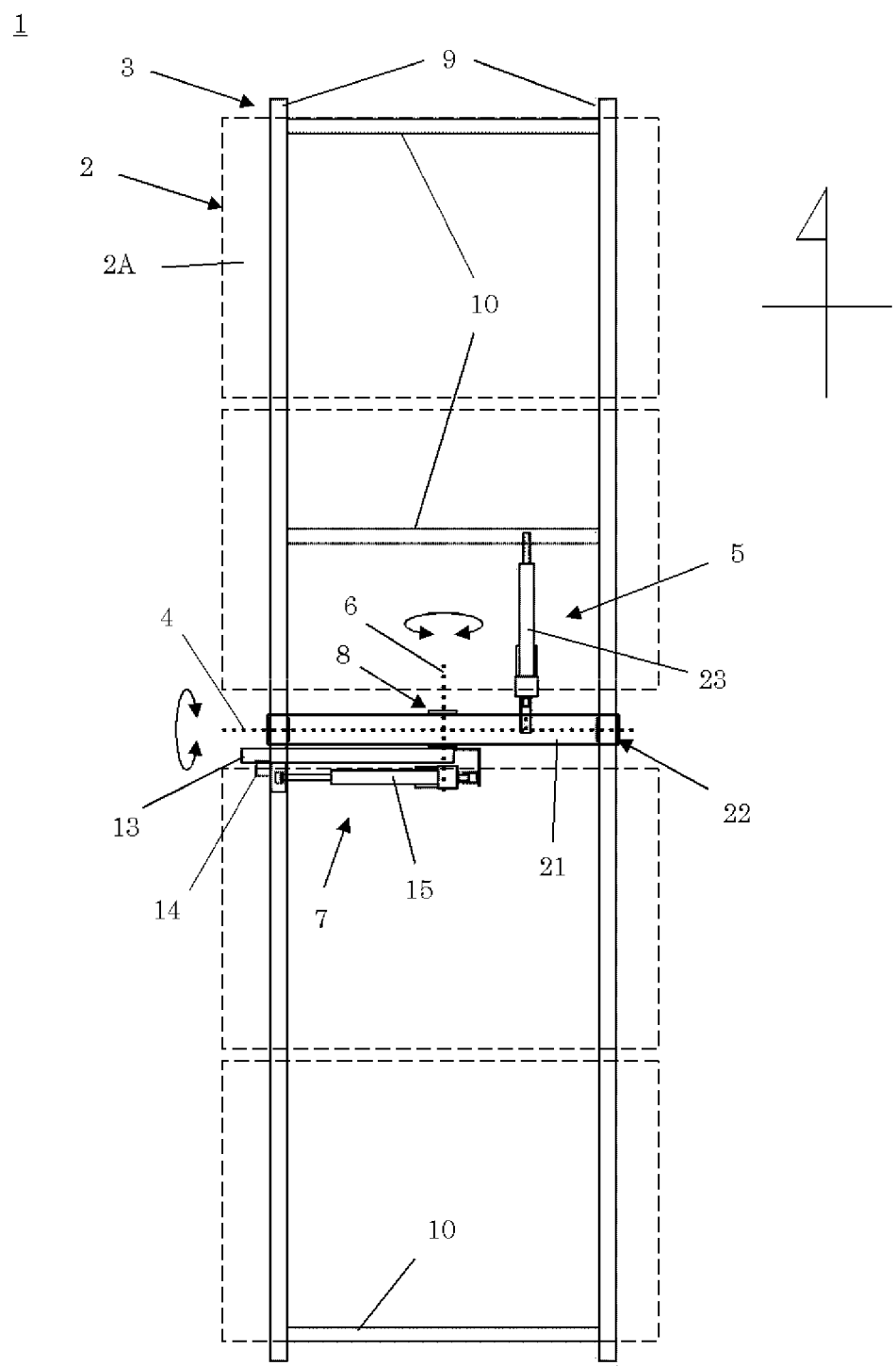
[FIG. 1]

[FIG. 2]
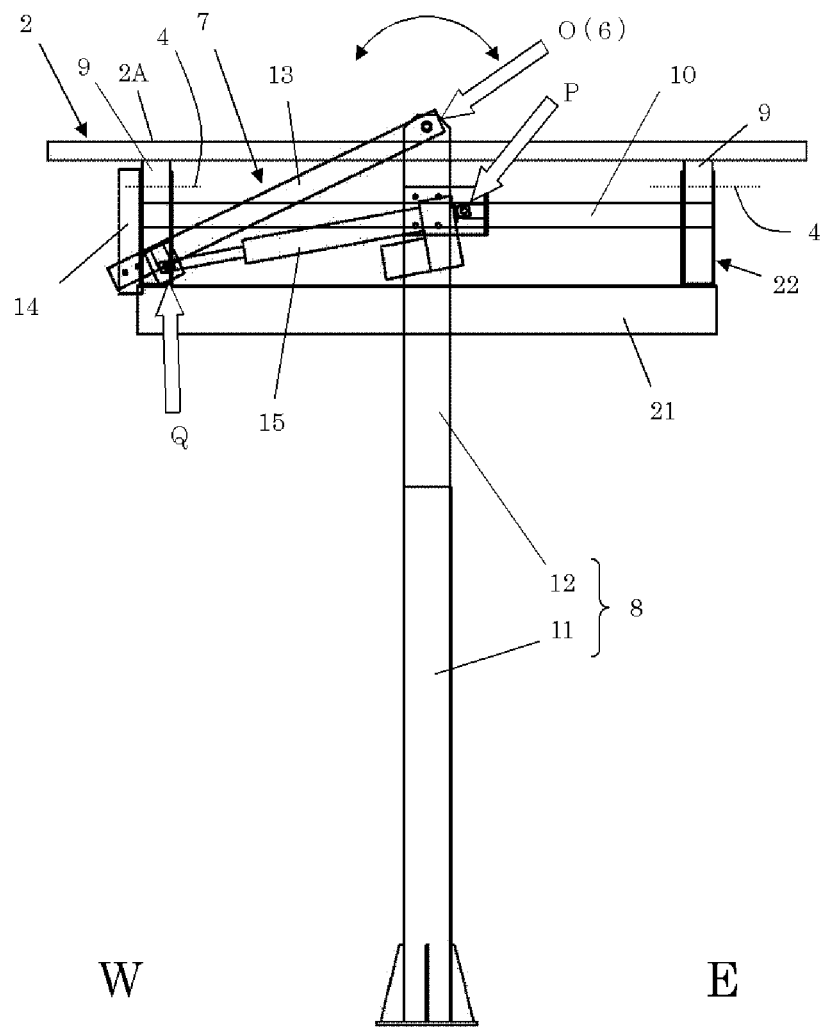
[FIG. 3]
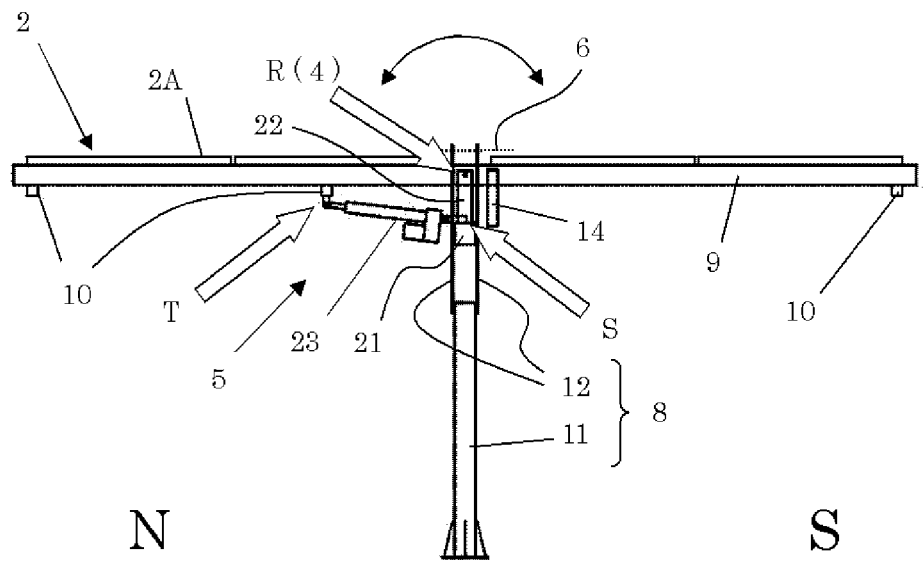

[FIG. 4]
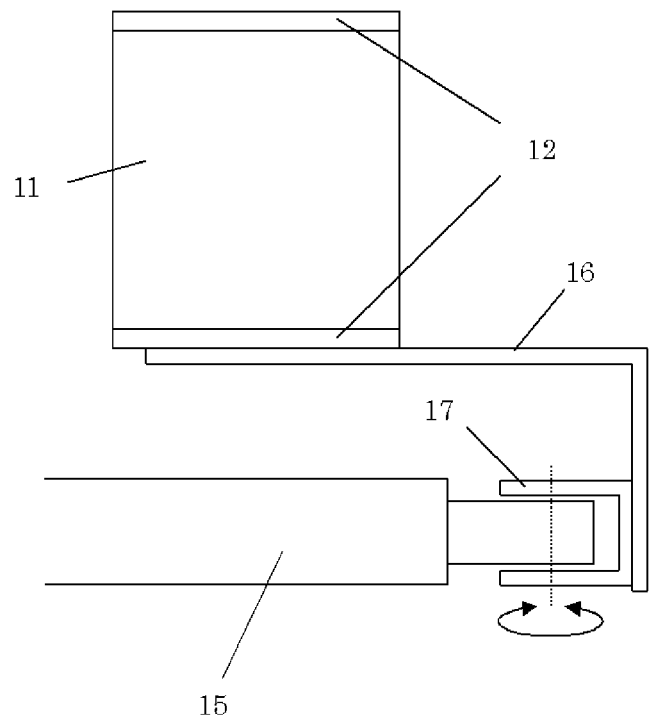
[FIG. 5]
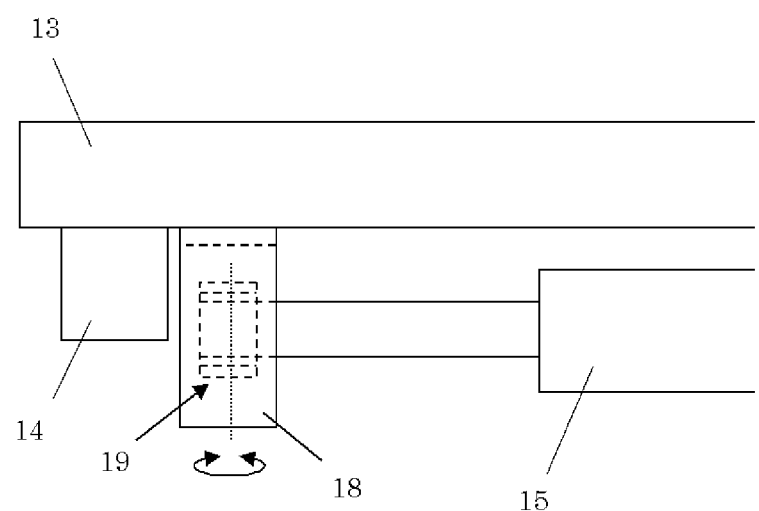

[FIG. 6]
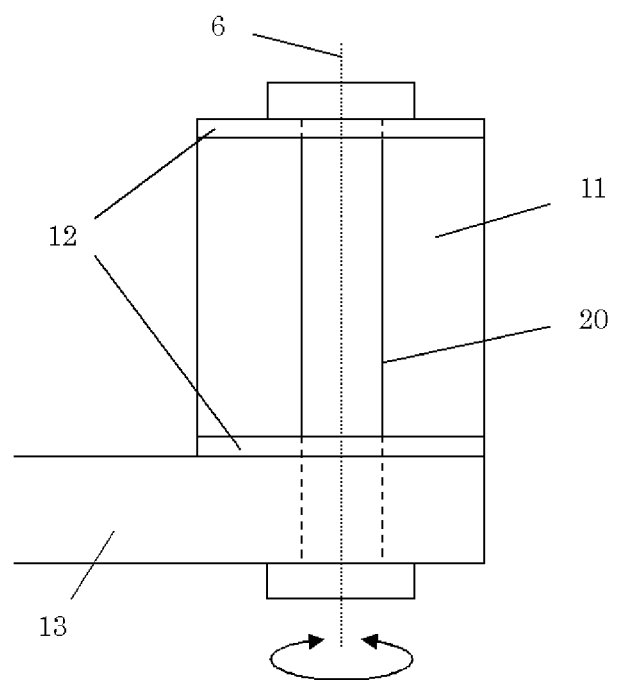

[FIG. 7]
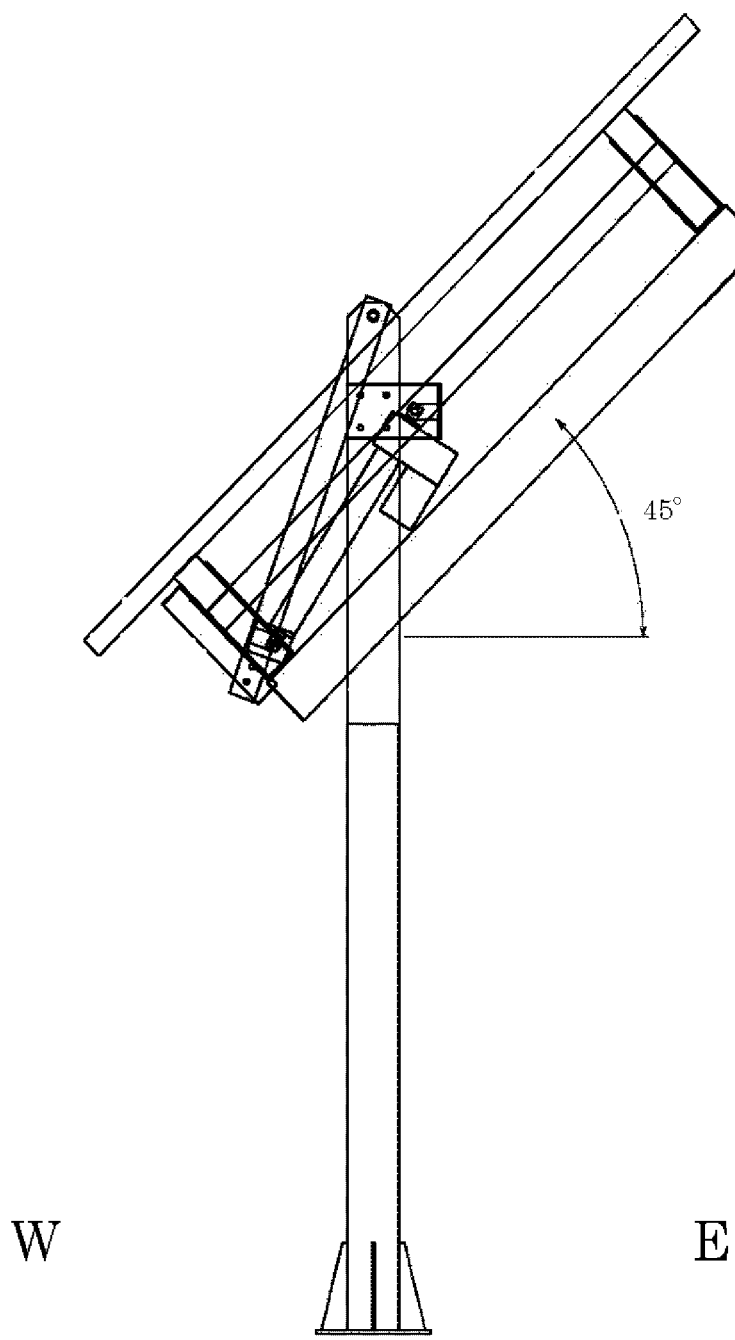

[FIG. 8]
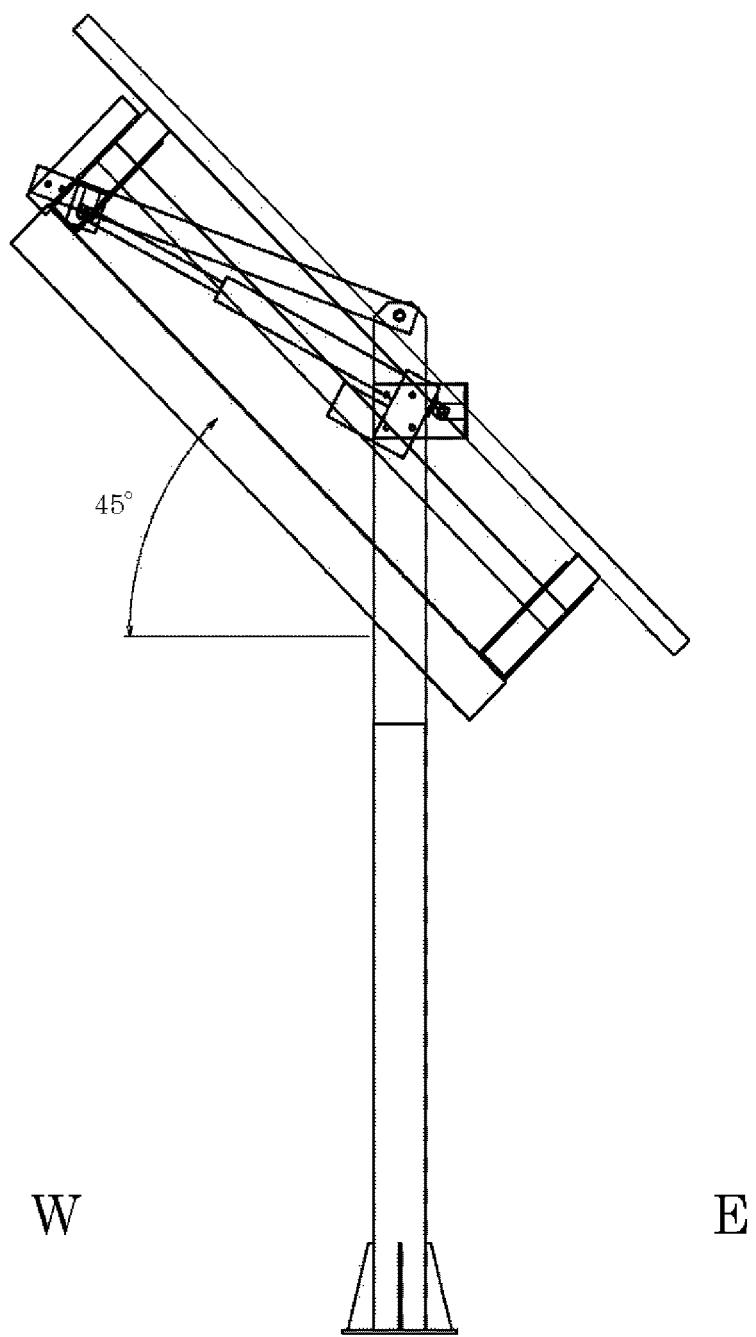

[FIG. 9]
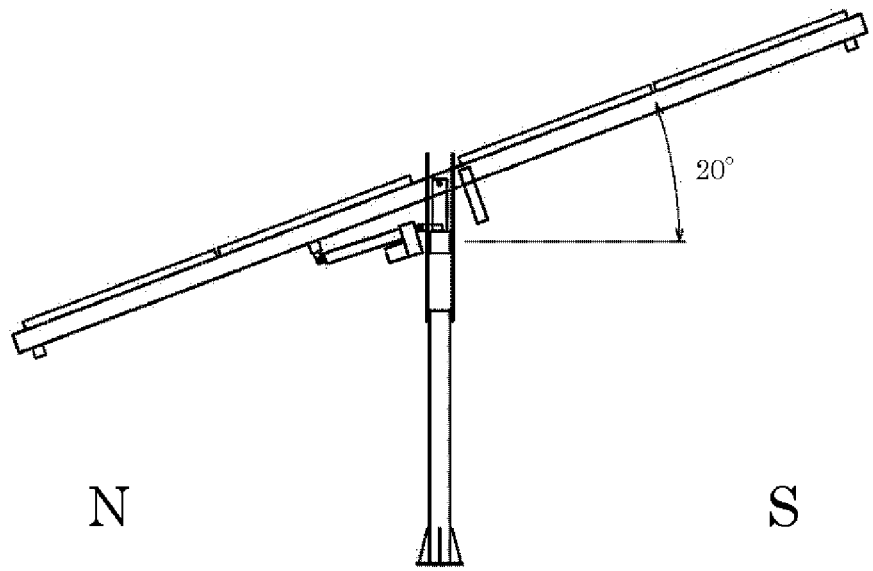
[FIG. 10]
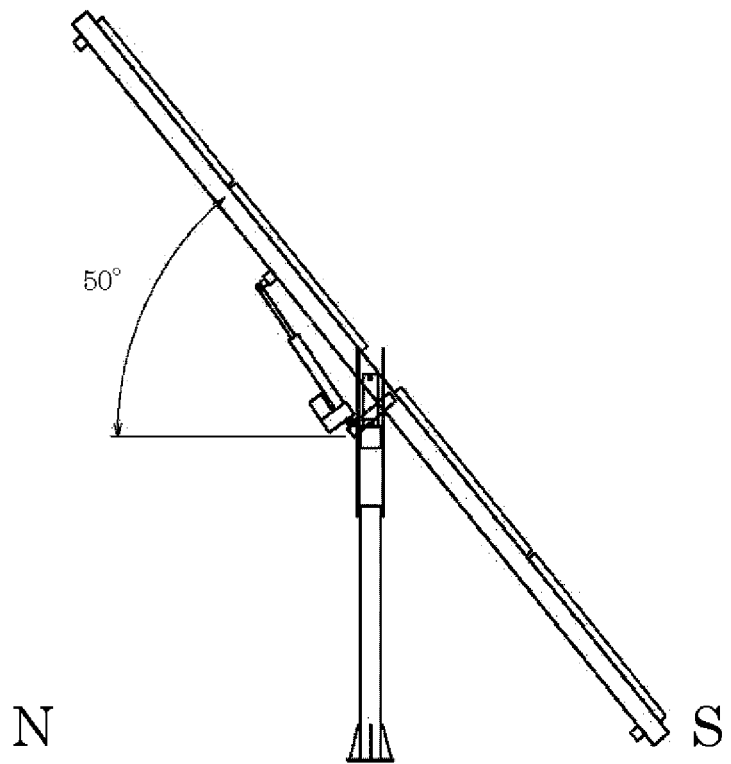

[FIG. 11]
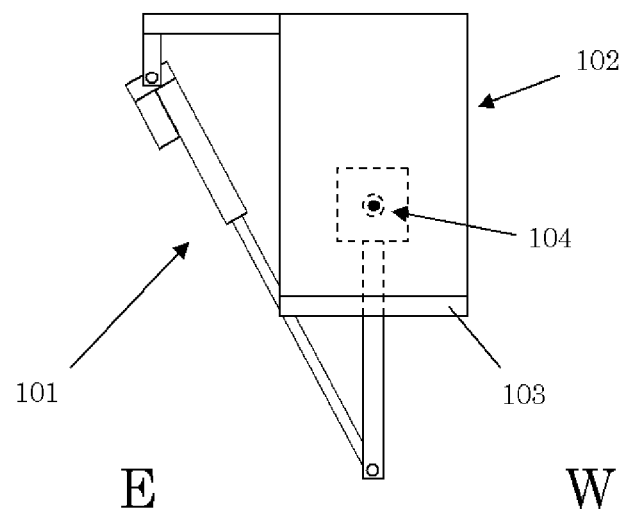
[FIG. 12]
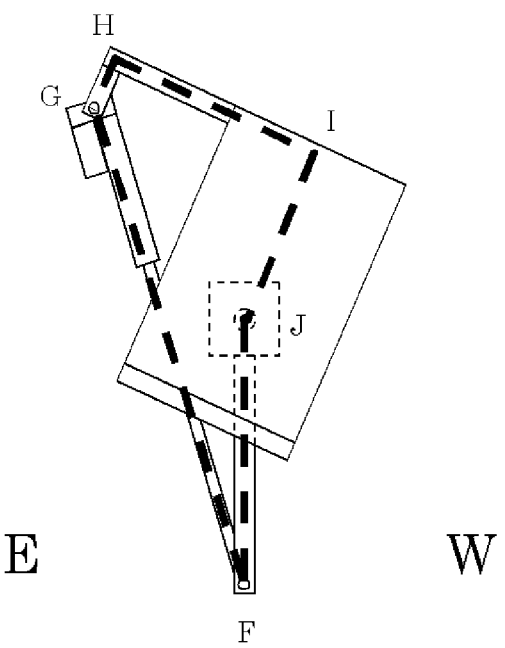

HELIOSTAT APPARATUS

TECHNICAL FIELD

The present invention relates to a heliostat apparatus including a solar battery panel.

BACKGROUND ART

Energy has been traditionally produced from fossil fuels such as petroleum, but in recent years, depletion of these fossil fuels and greenhouse effect gases such as carbon dioxide emitted by use of the fossil fuels and moreover, costs (fuel costs) for purchasing the fossil fuel have become problems.

Thus, sunlight, which is renewable and does not need fuel costs, has attracted attention as one of new energy sources.

Apparatuses using this sunlight as the energy source include a solar power generating apparatus including a solar battery module (solar battery panel), for example. In particular, the solar battery panel includes one whose installation angle is adjustable in accordance with movement of the sun (solar tracking type) (Patent Document 1).

CITATION LIST

Patent Literature

Patent Document 1: JP 2017-227408 A

SUMMARY OF INVENTION

Technical Problem

The conventional technology in Patent Document 1 includes an elevation angle rotation axis for rotating a solar battery panel in a north-south direction with an east-west direction as an axial direction and an azimuth angle rotation axis for rotating in the east-west direction with the north-south direction as an axial direction, and these elevation angle rotation axis and azimuth angle rotation axis are orthogonal to each other (cross each other three-dimensionally). In Patent Document 1, where the two rotation axes are orthogonal to each other as described, an east-west rotation mechanism for rotating in the east-west direction has a special structure.

A side view of this conventional east-west rotation mechanism seen from the north is shown in FIG. 11. As shown in FIG. 11, the east-west rotation mechanism in Patent Document 1 is a mechanism using an azimuth angle actuator 101. A plate-shaped coupling arm 103 that stretches horizontally is connected to the end of a coupling cover 102, the coupling arm 103 carries and supports an unshown frame thereon, and the frame supports an unshown solar battery panel from underneath. As clearly seen from FIG. 12, showing a westwardly rotated state, the coupling cover 102, the coupling arm 103, the frame, and the solar battery panel are integrally rotatable in the east-west direction by extension and contraction of the azimuth angle actuator 101 with the azimuth angle rotation axis 104 as the center.

However, the whole of the east-west rotation mechanism holding the frame has a pentagon shape made up of the five points F, G, H, I, and J in FIG. 12 within a plane of rotation in the east-west direction. This lowers the stability of the hold on the frame (moreover, the solar battery panel). Even if a north-south rotation mechanism has a structure that can hold the solar battery panel stably, stability of the hold on the solar battery panel is low, and vulnerable to wind or the like regarding the whole apparatus.

The present invention has been made in view of the above-described problem, and an object thereof is to provide a type of heliostat apparatus that follows the movement of the sun and can hold a solar battery panel stably.

Solution to Problem

To achieve the object, the present invention provides a heliostat apparatus including at least one solar battery panel and in which an angle of a panel surface of the solar battery panel is adjusted to follow movement of the sun, the heliostat apparatus comprising:

a frame supporting the solar battery panel;

a north-south rotation mechanism having an elevation angle rotation axis for rotating the frame in a north-south direction with an east-west direction as an axial direction;

an east-west rotation mechanism having an azimuth angle rotation axis for rotating the frame in an east-west direction with a north-south direction as an axial direction; and a support for supporting the frame, wherein the frame and the solar battery panel are integrally rotated in the north-south direction by the north-south rotation mechanism with the elevation angle rotation axis as a rotation axis so that an angle in the north-south direction of the panel surface of the solar battery panel supported by the frame is adjusted;

the frame and the solar battery panel are integrally rotated in the east-west direction by the east-west rotation mechanism with the azimuth angle rotation axis as a rotation axis so that an angle in the east-west direction of the panel surface of the solar battery panel supported by the frame is adjusted;

the elevation angle rotation axis and the azimuth angle rotation axis are in a skew positional relationship; and the north-south rotation mechanism and the east-west rotation mechanism each have a truss structure, the frame being held by the truss structure.

In a conventional apparatus, as described above, the elevation angle rotation axis and the azimuth angle rotation axis are orthogonal to each other, and therefore, a special structure as in FIG. 11 is necessary, and a pentagon shape is formed as in FIG. 12. Thus, it was not possible to form a truss structure for stably holding the frame, and moreover, the solar battery panel.

However, in the present invention, the elevation angle rotation axis and the azimuth angle rotation axis are in a skew positional relationship, and therefore are not orthogonal to each other (that is, do not cross each other three-dimensionally), and a truss structure can be formed in both the north-south rotation mechanism and the east-west rotation mechanism as a mechanism for rotating and holding the frame. Since the frame is actually held by both truss structures as described, the frame (solar battery panel) can be held stably.

Conventionally, due to the pentagon shape as shown in FIG. 12, the hold on the frame is structurally unstable, and a fracture due to the influence of wind load on the solar battery panel is liable to occur when a wind blows. On the other hand, in the present invention, the frame can be held stably by the truss mechanisms of both the north-south rotation mechanism and the east-west rotation mechanism as described above, and therefore, the occurrence of fracture due to wind load can be suppressed.

In addition, the above-described special structure has been necessary in a conventional apparatus where the elevation angle rotation axis and the azimuth angle rotation axis are orthogonal to each other, but in the present invention, they are in a skew positional relationship. Accordingly, a rotating structure can be formed separately regarding each rotation axis, and therefore, the structure around the rotation axes becomes simple, and productivity and constructability can be enhanced. Mass production and reduction of construction steps at the construction site are possible.

Furthermore, the north-south rotation mechanism can comprise:

a central crossbar that penetrates the support and that can be oscillated in the east-west direction; a coupling member for north-south rotation that couples the central crossbar and the frame; and an actuator for north-south rotation that couples the central crossbar and the frame, wherein the frame can be rotated in the north-south direction by extension and contraction of the actuator for north-south rotation, and the truss structure in the north-south rotation mechanism can be formed from three points: a coupling portion of the coupling member for north-south rotation and the frame; a coupling portion of the central crossbar and the actuator for north-south rotation; and a coupling portion of the actuator for north-south rotation and the frame.

Furthermore, the east-west rotation mechanism can comprise:

an east-west rotating member with one end coupled rotatably to the support; a coupling member for east-west rotation that couples another end of the east-west rotating member and the frame; and an actuator for east-west rotation that couples the other end of the east-west rotating member and the support, wherein the frame can be rotated in the east-west direction by extension and contraction of the actuator for east-west rotation, and the truss structure in the east-west rotation mechanism can be formed from three points: a coupling portion of the east-west rotating member and the support; a coupling portion of the support and the actuator for east-west rotation; and a coupling portion of the actuator for east-west rotation and the other end of the east-west rotating member.

These make it possible to rotate effectively in the north-south direction and the east-west direction by the extension and contraction of each actuator. Moreover, the above-described truss structure can be formed more certainly, and the frame can be held more firmly.

Advantageous Effects of Invention

As described above, according to the present invention, a solar battery panel can be held more stably than in a conventional apparatus, and fracture of an apparatus due to wind load can be prevented effectively. Moreover, productivity and constructability of the apparatus can be enhanced.

BRIEF DESCRIPTION OF DRAWINGS

FIG. 1 is a top view showing an example of the inventive heliostat apparatus.

FIG. 2 is a side view seen from the south showing an example of the inventive heliostat apparatus.

FIG. 3 is a side view seen from the west showing an example of the inventive heliostat apparatus.

FIG. 4 is a top explanatory view showing an example of a coupling state of a support and an actuator for east-west rotation.

FIG. 5 is a top explanatory view showing an example of a coupling state of an actuator for east-west rotation and an east-west rotating member and a coupling state of the east-west rotating member and a coupling member for east-west rotation.

FIG. 6 is a top explanatory view showing an example of a coupling state of an east-west rotating member and a support.

FIG. 7 is an explanatory view showing an example of a state where a solar battery panel has been rotated to the west.

FIG. 8 is an explanatory view showing an example of a state where a solar battery panel has been rotated to the east.

FIG. 9 is an explanatory view showing an example of a state where a solar battery panel has been rotated to the north.

FIG. 10 is an explanatory view showing an example of a state where a solar battery panel has been rotated to the south.

FIG. 11 is a side view of an east-west rotation mechanism of a conventional heliostat apparatus seen from the north.

FIG. 12 is an explanatory view showing a conventional east-west rotation mechanism in a state where a westward rotation has been made.

DESCRIPTION OF EMBODIMENTS

Hereinafter, the present invention will be described in detail as an example of an embodiment with reference to the drawings. However, the present invention is not limited thereto.

FIGS. 1 to 3 show an example of the inventive heliostat apparatus.

FIG. 1 is a top view. The up-and-down direction is the north-south direction, and the left-and-right direction is the east-west direction. In addition, FIG. 2 is a side view seen from the south, and FIG. 3 is a side view seen from the west. Note that, in order to make it easy to understand the structure of each mechanism for describing the east-west rotation mechanism and the north-south rotation mechanism and to make it easy to see the positional relationships between each of the members, there are portions in which the lines where the members overlap with each other have not been erased and have been kept.

As shown in FIGS. 1 to 3, the inventive heliostat apparatus 1 (hereinafter, also simply referred to as apparatus 1) includes: a solar battery panel 2; a frame 3 supporting the solar battery panel 2; a north-south rotation mechanism 5 having an elevation angle rotation axis 4 for rotating the frame 3 in a north-south direction with an east-west direction as an axial direction; an east-west rotation mechanism 7 having an azimuth angle rotation axis 6 for rotating the frame 3 in an east-west direction with a north-south direction as an axial direction; and a support 8 for supporting the frame 3.

Hereinafter, the configuration of each part will be described in detail, but these configurations are an example, and are not particularly limited.

(Solar Battery Panel, Frame, and Support)

At least one of the solar battery panel 2 having a panel surface 2A is sufficient, and the number and size thereof are not particularly limited. Here, four solar battery panels are provided.

The frame 3 includes, for example, two north-south frame members 9 that run along the north-south direction and three east-west frame members 10 that run along the east-west direction. A quadrilateral framework is constructed from the two north-south frame members and two east-west frame members, and the remaining one east-west frame member is disposed within the framework. These can be, for example, rectangular column members. In addition, this frame 3 supports the solar battery panels 2 from underneath.

Consequently, the frame 3 and the solar battery panels 2 are integrally rotated in the north-south direction (east-west direction) by the north-south rotation mechanism 5 (east-west rotation mechanism 7) described below with the elevation angle rotation axis 4 (azimuth angle rotation axis 6) as a rotation axis so that an angle in the north-south direction (east-west direction) of the panel surfaces 2A of the solar battery panels 2 supported by the frame 3 is adjusted.

In addition, the support 8 includes, for example, a support body 11 and two support plates 12 attached to the top of the support body 11. As in FIG. 3, the two support plates 12 are fixed facing each other so as to sandwich the top of the support body 11.

(East-West Rotation Mechanism)

In addition, as shown particularly in FIG. 2, the east-west rotation mechanism 7 has, for example: an east-west rotating member 13 with one end coupled rotatably to the support 8; a coupling member for east-west rotation 14 that couples the other end of the east-west rotating member 13 and the frame 3; and an actuator for east-west rotation 15 that couples the other end of the east-west rotating member 13 and the support 8. These configurations will be more specifically described.

FIG. 4 is a top explanatory view showing an example of a coupling state of the support 8 and the actuator for east-west rotation 15. An L-shaped member 16 is fixed to a side of one of the two support plates 12, and a U-shaped member 17 is fixed to the inner surface of the L-shaped member 16. One end of the actuator for east-west rotation 15 is coupled rotatably in the east-west direction in the space formed by the U-shaped member 17.

FIG. 5 is a top explanatory view showing an example of a coupling state of an actuator for east-west rotation 15 and an east-west rotating member 13. In addition, FIG. 5 also shows an example of a coupling state of the east-west rotating member 13 and a coupling member for east-west rotation 14.

An L-shaped member 18 is fixed to a side of the east-west rotating member 13, and a U-shaped member 19 is fixed to the inner surface of the L-shaped member 18 so that the bottom of the U shape is fixed. That is, the U shape is fixed in a state where the two ends thereof stretch towards the back of FIG. 5 (the bottom of the heliostat apparatus 1). In addition, one end (the other side of the side coupled to the support 8) of the actuator for east-west rotation 15 is coupled rotatably in the east-west direction in the space of the U-shaped member 19.

In addition, one end of the east-west rotating member 13 (the other side of the side coupled to the support 8) is coupled to the coupling member for east-west rotation 14 with a bolt, for example.

In addition, as shown in FIG. 2 and FIG. 3, the coupling member for east-west rotation 14 is coupled to a north-south frame member 9.

FIG. 6 is a top explanatory view showing an example of a coupling state of the east-west rotating member 13 and the support 8. The east-west rotating member 13 is disposed on the outside of one (southern side) of the two support plates 12, and one end (the other side of the side coupled to the coupling member for east-west rotation 14) is coupled to the support plate 12 rotatably in the east-west direction. For example, an azimuth angle rotation shaft 20 penetrating the two support plates 12 and the east-west rotating member 13 can be provided, but this rotatable mechanism is not limited thereto. The central axis of this azimuth angle rotation shaft 20 corresponds to the azimuth angle rotation axis 6. The east-west rotating member 13 rotates in the east-west direction by the extension and contraction of the actuator for east-west rotation 15 with the azimuth angle rotation axis 6 as the center. At the same time, the frame 3, coupled to the east-west rotating member 13 through the coupling member for east-west rotation 14 rotates integrally in the east-west direction.

Moreover, the east-west rotation mechanism 7 forms a truss structure for holding the frame 3 by the above-described configuration within the plane of rotation in the east-west direction. Specifically, as shown in FIG. 2, the truss structure OPQ is formed from three points: a coupling portion O of the east-west rotating member 13 and the support 8 (support plate 12); a coupling portion P of the support 8 (support plate 12) and the actuator for east-west rotation 15; and a coupling portion Q of the actuator for east-west rotation 15 and the other end of the east-west rotating member 13.

(North-South Rotation Mechanism)

Next, as shown particularly in FIG. 3, the north-south rotation mechanism 5 has, for example: a central crossbar 21 that penetrates the support 8 and that can be oscillated in the east-west direction; a coupling member for north-south rotation 22 that couples the central crossbar 21 and the frame 3; and an actuator for north-south rotation 23 that couples the central crossbar 21 and the frame 3. These configurations will be more specifically described.

As shown in FIG. 1 and FIG. 3, the central crossbar 21 passes between the two support plates 12.

In addition, as shown in FIG. 2, a U-shaped coupling member for north-south rotation 22 is disposed at one end of the central crossbar 21. The bottom of the U shape of the coupling member for north-south rotation 22 is fixed to the central crossbar 21, and the north-south frame member 9 passes through the space between the two ends of the U shape. The north-south frame member 9 and the coupling member for north-south rotation 22 are coupled so that the north-south frame member 9 can be rotated in the north-south direction. In addition, another U-shaped coupling member for north-south rotation 22 is disposed at the other end of the central crossbar 21 in the same manner, and a north-south frame member 9 is rotatably coupled.

The line connecting these two coupling portions corresponds to the elevation angle rotation axis 4.

In addition, as shown in FIG. 3, one end of the actuator for north-south rotation 23 is coupled rotatably in the north-south direction to the central crossbar 21. Furthermore, the other end of the actuator for north-south rotation 23 (the other side of the side coupled to the central crossbar 21) is coupled rotatably in the north-south direction to the one east-west frame member 10 disposed within the quadrilateral framework of the frame 3. Coupling means for these are not particularly limited, and an appropriate member such as a U-shaped member can be used in the same manner as the east-west rotation mechanism 7.

In addition, the frame 3 can be rotated in the north-south direction by the extension and contraction of the actuator for north-south rotation 23 with the above-described elevation angle rotation axis 4 as the center.

Moreover, the north-south rotation mechanism 5 forms a truss structure for holding the frame 3 by the above-described configuration within the plane of rotation in the north-south direction. Specifically, as shown in FIG. 3, the truss structure RST is formed from three points: a coupling portion R of the coupling member for north-south rotation 22 and the frame 3 (north-south frame member 9); a coupling portion S of the central crossbar 21 and the actuator for north-south rotation 23; and a coupling portion T of the actuator for north-south rotation 23 and the frame 3 (east-west frame member 10).

In this manner, truss structures OPQ and RST for holding the frame 3 are formed in both the north-south rotation mechanism 5 and the east-west rotation mechanism 7, and this is because the elevation angle rotation axis 4 in the north-south rotation mechanism 5 and the azimuth angle rotation axis 6 in the east-west rotation mechanism 7 are in a skew positional relationship (do not cross each other three-dimensionally), as can be seen particularly in FIG. 2 and FIG. 3.

With such a positional relationship, a truss structure, being a stable structure, can be formed easily in both rotation mechanisms at the same time. In this manner, the frame 3, and moreover, the solar battery panels 2 can be held extremely stably. Accordingly, the frame 3 can be held firmly even when a wind blows, and members of the apparatus 1 can be effectively prevented from being fractured by the load of wind.

On the other hand, in a rotation mechanism of a conventional apparatus where the above two rotation axes are orthogonal to each other (cross each other three-dimensionally), for example, it becomes necessary to form a special structure as shown in FIG. 12, and moreover, the structure is a pentagon shape, which is an unstable structure. Consequently, fractures, defects, or the like of members are liable to occur when a wind blows.

Furthermore, in the conventional apparatus, the neighborhood of the rotation axis is complex and has a special structure since two rotation axes are orthogonal to each other, but in the inventive apparatus 1, the two rotation axes are in a skew positional relationship, and do not cross each other, and therefore, the rotation structure around the rotation axis can be easily simplified. Consequently, manufacturing and construction of each member for the rotation mechanisms can be performed easily. That is, mass production becomes easy, and the construction operation at the construction site becomes easy.

In addition, FIG. 7 shows a state where the solar battery panel 2 has been rotated to the west by the east-west rotation mechanism 7. The state is a state where a 45-degree tilt has been made to the west relative to the horizontal by contraction of an arm of the actuator for east-west rotation 15.

In addition, FIG. 8 shows a state where the solar battery panel 2 has been rotated to the east by the east-west rotation mechanism 7. The state is a state where a 45-degree tilt has been made to the east relative to the horizontal by extension of the arm of the actuator for east-west rotation 15.

Furthermore, FIG. 9 shows a state where the solar battery panel 2 has been rotated to the north by the north-south rotation mechanism 5. The state is a state where a 20-degree tilt has been made to the north relative to the horizontal by contraction of an arm of the actuator for north-south rotation 23.

In addition, FIG. 10 shows a state where the solar battery panel 2 has been rotated to the south by the north-south rotation mechanism 5. The state is a state where a 50-degree tilt has been made to the south relative to the horizontal by extension of the arm of the actuator for north-south rotation 23.

As described, it is adjustable to rotate in the east-west direction or the north-south direction by the extension and contraction of the actuator for east-west rotation 15 of the east-west rotation mechanism 7 and the actuator for north-south rotation 23 of the north-south rotation mechanism 5. In this way, the angle of the panel surface 2A of the solar battery panel 2 can be adjusted so as to track the sun appropriately.

As described above, the angle of the panel surface 2A of the solar battery panel 2 of the inventive heliostat apparatus 1 can be adjusted so as to track the sun appropriately, simply, and conveniently by the north-south rotation mechanism 5 and the east-west rotation mechanism 7. At the same time, the solar battery panel 2 can be held firmly and rotatably by the truss mechanisms in both of the above mechanisms. Moreover, cost can be lowered by mass production, and time and effort can be reduced by improvement in constructability.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

In the above example, explanation was given with reference to specific members such as the central crossbar in the north-south rotation mechanism and the east-west rotating member in the east-west rotation mechanism, but these members/configurations are not limiting. It is sufficient for the elevation angle rotation axis and the azimuth angle rotation axis to be in a skew positional relationship, and for a truss mechanism for supporting the frame to be provided in each rotation mechanism.

The invention claimed is:

1. A heliostat apparatus including at least one solar battery panel and in which an angle of a panel surface of the solar battery panel is adjusted to follow movement of the sun, the heliostat apparatus comprising:
   a frame supporting the solar battery panel;
   a north-south rotation mechanism having an elevation angle rotation axis for rotating the frame in a north-south direction with an east-west direction as an axial direction;
   an east-west rotation mechanism having an azimuth angle rotation axis for rotating the frame in an east-west direction with a north-south direction as an axial direction; and
   a support for supporting the frame,
   wherein the frame and the solar battery panel are integrally rotated in the north-south direction by the north-south rotation mechanism with the elevation angle rotation axis as a rotation axis so that an angle in the north-south direction of the panel surface of the solar battery panel supported by the frame is adjusted,
   the frame and the solar battery panel are integrally rotated in the east-west direction by the east-west rotation mechanism with the azimuth angle rotation axis as a rotation axis so that an angle in the east-west direction of the panel surface of the solar battery panel supported by the frame is adjusted,
   the elevation angle rotation axis and the azimuth angle rotation axis are in a skew positional relationship,
   one of the elevation angle rotation axis and the azimuth angle rotation axis passes through a top of the support and is disposed higher than the other of the elevation angle rotation axis and the azimuth angle rotation axis, the solar battery panel is disposed between the elevation angle rotation axis and the azimuth angle rotation axis, and the north-south rotation mechanism and the east-west rotation mechanism each have a truss structure, the frame being held by the truss structure.

2. The heliostat apparatus according to claim 1, wherein the one of the elevation angle rotation axis and the azimuth angle rotation axis passing through the top of the support is the azimuth angle rotation axis.

3. The heliostat apparatus according to claim 1, wherein the north-south rotation mechanism comprises:
   a central crossbar that penetrates the support and that can be oscillated in the east-west direction;
   a coupling member for north-south rotation that couples the central crossbar and the frame; and
   an actuator for north-south rotation that couples the central crossbar and the frame,
   wherein the frame is rotated in the north-south direction by extension and contraction of the actuator for north-south rotation, and
   the truss structure in the north-south rotation mechanism is formed from three points:
      a coupling portion of the coupling member for north-south rotation and the frame,
      a coupling portion of the central crossbar and the actuator for north-south rotation, and
      a coupling portion of the actuator for north-south rotation and the frame.

4. The heliostat apparatus according to claim 3, wherein the east-west rotation mechanism comprises:
   an east-west rotating member with one end coupled rotatably to the support;
   a coupling member for east-west rotation that couples another end of the east-west rotating member and the frame; and
   an actuator for east-west rotation that couples the other end of the east-west rotating member and the support,
   wherein the frame is rotated in the east-west direction by extension and contraction of the actuator for east-west rotation, and
   the truss structure in the east-west rotation mechanism is formed from three points:
      a coupling portion of the east-west rotating member and the support,
      a coupling portion of the support and the actuator for east-west rotation, and
      a coupling portion of the actuator for east-west rotation and the other end of the east-west rotating member.

5. The heliostat apparatus according to claim 3, wherein the one of the elevation angle rotation axis and the azimuth angle rotation axis passing through the top of the support is the azimuth angle rotation axis.

6. The heliostat apparatus according to claim 1, wherein the east-west rotation mechanism comprises:
   an east-west rotating member with one end coupled rotatably to the support;
   a coupling member for east-west rotation that couples another end of the east-west rotating member and the frame; and
   an actuator for east-west rotation that couples the other end of the east-west rotating member and the support,
   wherein the frame is rotated in the east-west direction by extension and contraction of the actuator for east-west rotation, and
   the truss structure in the east-west rotation mechanism is formed from three points:
      a coupling portion of the east-west rotating member and the support,
      a coupling portion of the support and the actuator for east-west rotation, and
      a coupling portion of the actuator for east-west rotation and the other end of the east-west rotating member.

7. The heliostat apparatus according to claim 6, wherein the one of the elevation angle rotation axis and the azimuth angle rotation axis passing through the top of the support is the azimuth angle rotation axis.

8. The heliostat apparatus according to claim 4, wherein the one of the elevation angle rotation axis and the azimuth angle rotation axis passing through the top of the support is the azimuth angle rotation axis.

\* \* \* \* \*